United States Patent [19]
Mankins

[11] Patent Number: 6,161,563
[45] Date of Patent: Dec. 19, 2000

[54] PLUMBING TOOL

[76] Inventor: John M. Mankins, 7320 Pinal Ave., Atascadero, Calif. 93422

[21] Appl. No.: 09/034,880

[22] Filed: Mar. 4, 1998

Related U.S. Application Data

[62] Division of application No. 08/777,407, Dec. 30, 1996, Pat. No. 5,740,830.

[51] Int. Cl.⁷ .............................. F16K 43/00; B08B 9/04
[52] U.S. Cl. .................................. 137/15.14; 15/104.09; 15/104.33; 137/15.07; 137/318; 408/127; 408/227
[58] Field of Search .......................... 137/318, 15, 15.07, 137/15.14; 408/127, 227; 15/104.02, 104.03, 104.33, 104.09

[56] References Cited

U.S. PATENT DOCUMENTS

| | | |
|---|---|---|
| 396,177 | 1/1889 | Smith . |
| 2,756,486 | 7/1956 | Smith . |
| 2,972,915 | 2/1961 | Milanovits et al. ...................... 137/318 |
| 3,272,033 | 9/1966 | Leopold, Jr. et al. ................... 137/318 |
| 3,335,742 | 8/1967 | Novak . |
| 3,598,141 | 8/1971 | Yamo . |
| 3,646,954 | 3/1972 | Hutton . |
| 3,928,885 | 12/1975 | Peterson et al. . |
| 4,128,107 | 12/1978 | Blumhardt ............................ 137/318 |
| 4,216,793 | 8/1980 | Volgstadt et al. ....................... 137/318 |
| 4,364,140 | 12/1982 | Irwin ................................... 15/104.33 |
| 4,429,588 | 2/1984 | Sullivan . |
| 4,475,566 | 10/1984 | Haines ................................. 137/318 |
| 4,587,859 | 5/1986 | Coombes et al. ....................... 137/318 |
| 4,598,731 | 7/1986 | Colson . |
| 4,611,624 | 9/1986 | Snyder ................................. 137/318 |
| 4,626,142 | 12/1986 | Brin et al. . |
| 4,761,024 | 8/1988 | Ewen ................................... 137/318 |
| 4,936,350 | 6/1990 | Huber . |
| 4,974,280 | 12/1990 | Ward .................................. 15/104.33 |
| 5,033,510 | 7/1991 | Huber . |
| 5,044,393 | 9/1991 | Jiles . |
| 5,056,176 | 10/1991 | Belcher ............................... 15/104.33 |
| 5,163,480 | 11/1992 | Huber . |
| 5,199,129 | 4/1993 | Salecker et al. ...................... 15/104.33 |
| 5,418,997 | 5/1995 | DeFrange . |
| 5,620,020 | 4/1997 | Colline . |

Primary Examiner—George L. Walton
Attorney, Agent, or Firm—Leo F. Costello

[57] ABSTRACT

A plumbing tool for providing a passageway through a blockage, such as a test cap or other blockage, in a fluid-carrying line. During the rough-in plumbing phase of construction, the drain pipe leading from the plumbing system in a building to the city sewer main in the street is positively sealed off by a test cap welded in the pipe at the location of the clean-out. Pressurizing the rough-in plumbing to test the same can then proceed knowing that if any leaks occur, they are in the branch plumbing on the building side of the test cap and not at or in the test cap. Following successful completion of the initial test, the top-out plumbing is completed, leaving the test cap welded in the clean-out or drain pipe. After the roof vents are in, the top-out test of the plumbing system is made, again knowing that if the system shows any leaks, they are the result of a failure in the plumbing work and not a failure of the test cap. After the plumbing system has passed final test and inspection, a special tool constructed in accordance with the present invention is inserted down the clean-out to penetrate and ream-out the test cap, so that the drain pipe is at substantially its normal inside diameter and provides a relatively full opening through which the waste can flow to the city sewer main in the street. The tool is also useful for cutting through other blockages in the line.

14 Claims, 5 Drawing Sheets

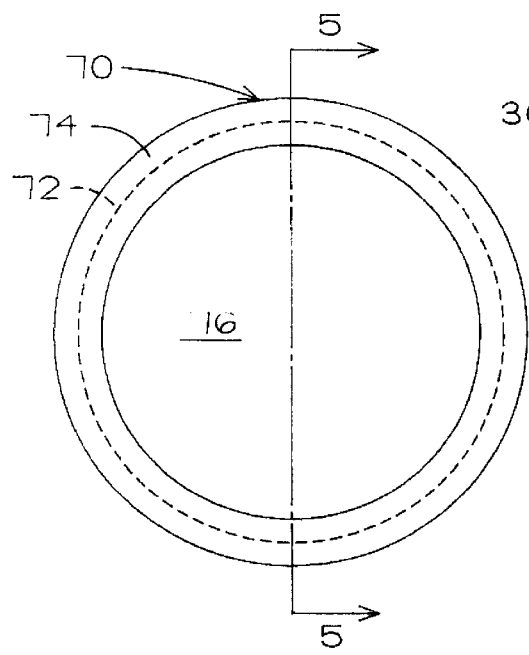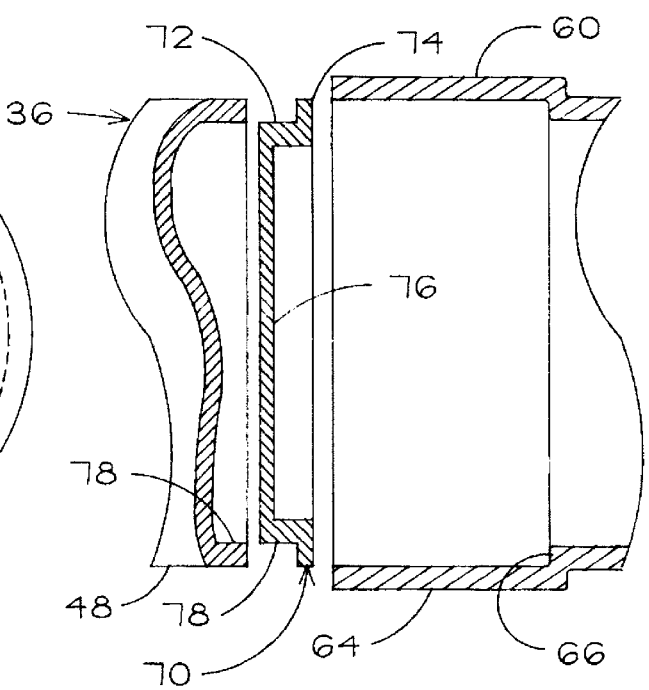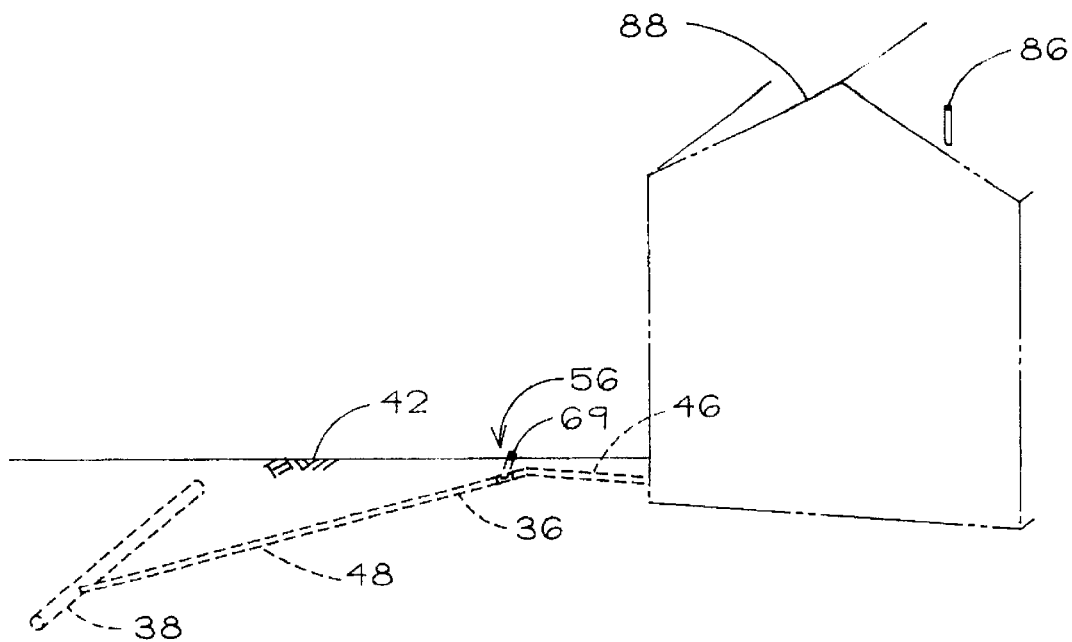

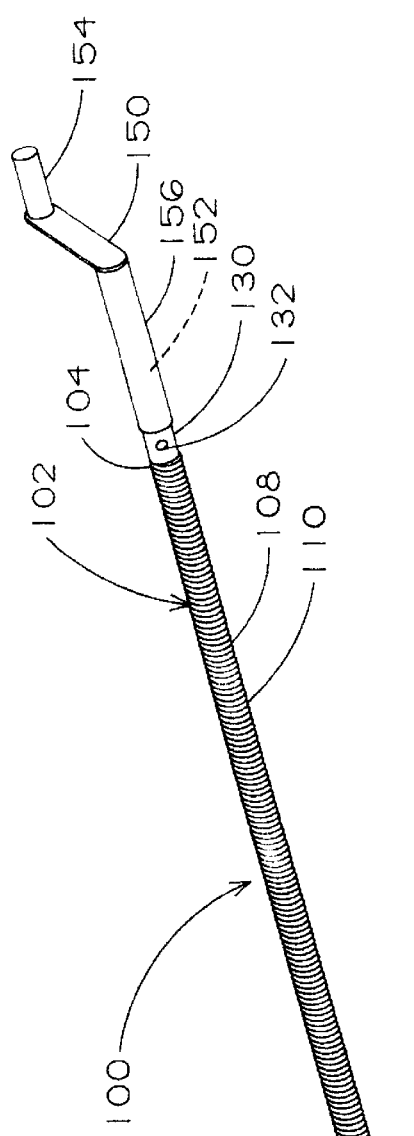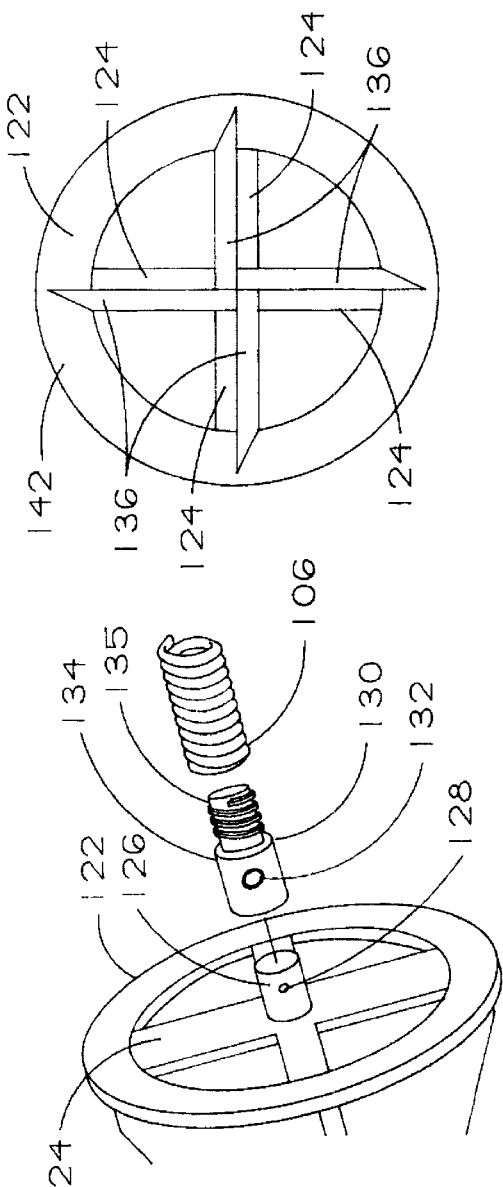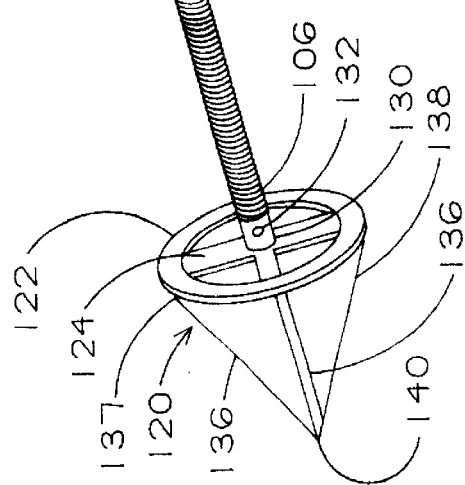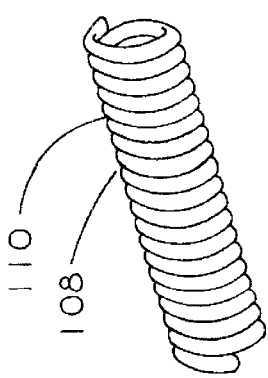

PLUMBING TOOL

CROSS-REFERENCE TO RELATED APPLICATION

This application is a divisional of my application Ser. No. 08/777,407, filed Dec. 30, 1996, now U.S. Pat. No. 5,740,830.

FIELD OF THE INVENTION

The present invention pertains to a plumbing tool and more particularly to a plumbing tool for providing a passageway through a blockage in a fluid-carrying line.

BACKGROUND

In residential house construction and as is well known, the plumbing is basically installed in three stages, namely, the rough-in plumbing, top-out plumbing and finish plumbing. The rough-in plumbing occurs prior to pouring of concrete. Top-out plumbing follows framing the building and involves installing the pipes in the walls and vent pipes that extend up through the roof of the structure. Finish plumbing relates to setting toilets, sinks, and the like.

The rough plumbing includes laying a drain or waste pipe which leads from building to the city sewer main normally in the access street or road adjacent to the building. It is common practice to insert a clean-out in the drain pipe between the pipes in the building and the section of the drain pipe that leads to the sewer line. This clean-out may be located in a basement or, in a building without a basement, outside the building and underground. If underground, the clean-out has a branch extending to the surface of the ground for providing access to the drain pipe both during construction and during use of the building.

As is well known, in order to pass the rigid inspection normally imposed by building codes, it is necessary to test the drainage part of the plumbing system after the rough-in and top-out stages are finished. For this purpose, common procedures and devices are in use. The devices include test caps and inflatable test plugs, so-called water-weenies. In use, the test caps are sealed at the ends of all open and exposed branch pipes, and the inflatable test plugs are used in the clean-out where the passageway plugged is not as accessible. After the tests, the exposed test caps are punched out with a hammer, and the inflatable plugs are deflated and pulled out of the clean-out. Thus, the test plugs and the inflatable plugs can be removed without disassembling and disturbing the tested system.

As indicated, the test caps in above-ground, accessible locations are usually knocked out with a hammer, whereupon the fragments are pried out with a screwdriver or pliers. If a test cap were sealed in a clean-out, however, whether the clean-out is relatively accessible in a basement or whether it is underground, it cannot be punched out with a hammer and screwdriver without disassembling part of the system and thereby disturbing the tested system. Thus test caps have not been used to block the test pressure in the drain pipe.

Instead, during the rough-in plumbing stage the inflatable weenie-shaped, test plugs have been inserted in the clean-out, used for the tests and subsequently removed with a pull chain attached to the plug and extending out of the clean-out. More specifically to test the rough-in plumbing the plug is inserted and inflated thereby sealing the drain pipe. The plumbing on the building side of the plug is then pressurized to check for leaks. After the top-out phase is completed the plumbing is again tested by again inflating the plug, and pressurizing the system, usually by feeding water into the system through the vent pipes in the roof.

Use of such inflatable weenie plugs for the described testing has proved unsatisfactory for several reasons. The essential problem is that the plugs often leak although the plumbing may be entirely sound. Either the plug does not seal perfectly circumferentially within the pipe or the plug is punctured as it is being slid in or out of the clean-out and against the rough surfaces thereof. As a result, the test fails, not because of faulty plumbing, but because of a faulty plug, the plumbing crew will then need to be called back to the job to attend to the problem, causing aggravation and extra expense to the contractors and owners involved. Not only is there extra labor cost involved, hut the failed inflatable test plugs must be replaced at considerable expense.

SUMMARY

A plumbing tool for providing a passageway through a blockage, such as a test cap or other blockage, in a fluid-carrying line is provided. During the rough-in plumbing phase of construction, the drain pipe leading from the plumbing, system in a building to the city sewer main in the street is positively sealed off by a test cap welded in the pipe at the location of the clean-out. Pressurizing the rough-in plumbing to test the same can then proceed knowing that if any leaks occur, they are in the branch plumbing on the building side of the test cap and not at or in the test cap. Following successful completion of the initial test the top-out plumbing is completed, leaving the test cap welded in the clean-out or drain pipe. After the roof vents are in, the top-out test of the plumbing system is made, again knowing that if the system shows any leaks, they are the result of a failure in the plumbing work and not a failure of the test cap. After the plumbing system has passed final test and inspection, a special tool constructed in accordance with the present invention is inserted down the clean-out to penetrate and ream-out the test cap, so that the drain pipe is at substantially its normal inside diameter and provides a relatively full opening through which the waste can flow to the city sewer main in the street. The tool is also useful for cutting through other blockages in the line.

An object of this invention is to be able to provide a passageway through a test plug or other blockage in a fluid-carrying line.

Another object is to provide a tool that can be extended into a clean-out and can cut out a plug or other blockage that is secured in a fluid-tight manner in a drain pipe to which the clean-out is connected.

Still another object is to be able from a remote position to maneuver and guide a cutting head of a tool inside a clean-out and into a position therein to ream out a test cap welded in the clean-out or other blockage in the line.

A further object is to provide a tool that can flex around a transition such as a corner from a branch line to a main line and thereby cut-out a blockage in the main line.

An additional object is to provide a tool for cutting a test cap out of a clean-out and that is adapted to attach cutting heads of different sizes for different diameter pipes.

Yet another object is to provide a test cap- or other blockage-removing tool that is adapted to change its length depending on the distance between the test cap-to-be-removed and the location of the operation of the tool.

A further object to provide a test cap-removing tool that cooperates with a clean-out to leverage the cutting head into a cutting position and then allows the cutting head to ream out the test cap or other blockage.

A still further object is to enable a test plug or other blockage that has been welded or otherwise fixed in fluid-tight relation in a drain pipe to be removed so that nearly the full diameter of the drain pipe is available for conducting material therethrough after the plug or other blockage has been removed.

These and other objects and advantages of the invention will become apparent upon reference to the accompanying drawings and the following detailed description.

DESCRIPTION OF THE DRAWINGS

FIG. 4 is a still further enlarged end view of the test cap shown in FIGS. 2 and 3 as seen from the upstream end of the cap.

FIG. 5 an exploded longitudinal diametrical section of the test cap taken on a plane indicated by line 5—5 of FIG. 4 but showing the test cap between the drain pipe and the clean-out and illustrating how these three parts will interfit when assembled.

FIG. 6 is a view similar to FIG. 1 but on a reduced scale and intended to represent the plumbing system after the second or top-out stage thereof has been completed.

FIG. 7 is an isometric view of a tool used in carrying out the method of the present invention and including a cutting head, a flexible shaft, and handles.

FIG. 8 is an enlarged end view of the cutting head of the tool shown in FIG. 7.

FIG. 9 is an enlarged, exploded, isometric view of the tool of FIG. 7 with the head and shaft being fragmentary and showing how the cutting head is releasably connected to the shaft.

FIG. 10 is an enlarged isometric view of the shaft showing the turns of the coil spring construction of the shaft.

DETAILED DESCRIPTION

Figure 1:
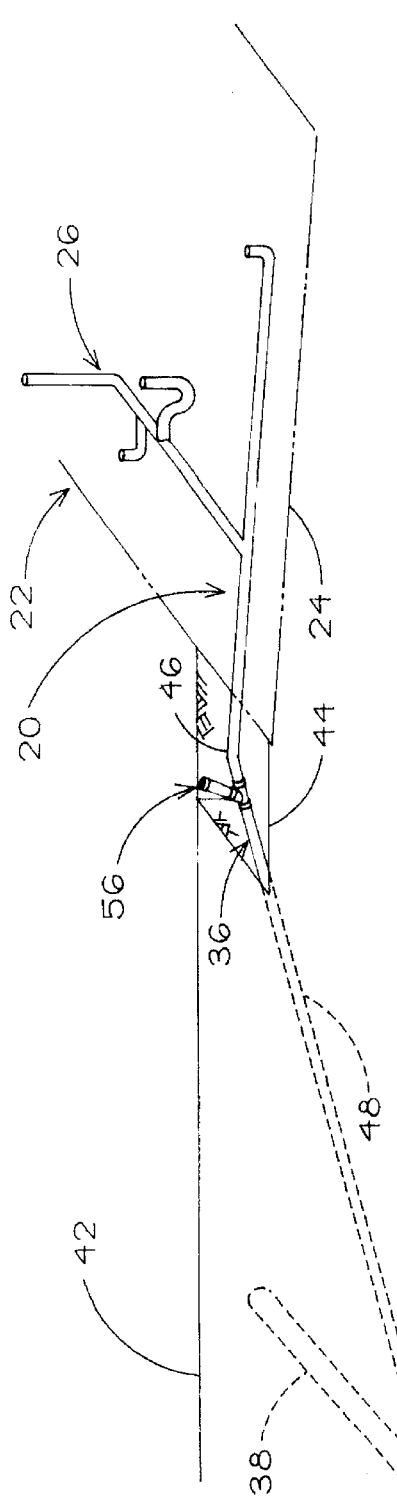
FIG. 1 is an isometric view slowing a schematic representation of a plumbing installation in a residential building construction that is intended to represent the plumbing installation after the rough-in plumbing or first stage of the plumbing installation has been completed and during which a clean-out is installed in a drain pipe leading from the building to a public sewer line.

Prior to describing the method and apparatus of the present invention, reference will be briefly made to the environment in which the invention is used. Thus in FIG. 1, a plumbing system is schematically shown and generally indicated by the numeral 20 in a residential building construction 22, with the plumbing system being represented at the rough plumbing stage. Only the foundation area 24 and a few of the interior pipes 26 of the plumbing system are shown thereby indicating that only the basic pipes have been installed and that none of the finish plumbing is in nor are the appliances installed.

During the rough-in plumbing stage (FIG. 1), a drain pipe 36 is connected between the interior plumbing 26 and a city sewer main or public sewer line 38 which usually runs underneath the street or road in front of the construction 22. The drain pipe is typically made of a plastic such as ABS or PVC, but it may be cast iron or copper or other suitable material. For drainage purposes, the pipe usually has a three- or four-inch diameter and is laid with enough slope to enable drainage. As is well known, the ground 42 around the construction is excavated to provide a large trench or open area 44 below normal ground level so the drain pipe can be connected to the sewer line. The drain pipe has an upper section 46 connected to the interior plumbing and a lower section 48 connected to the sewer line.

Figure 2:
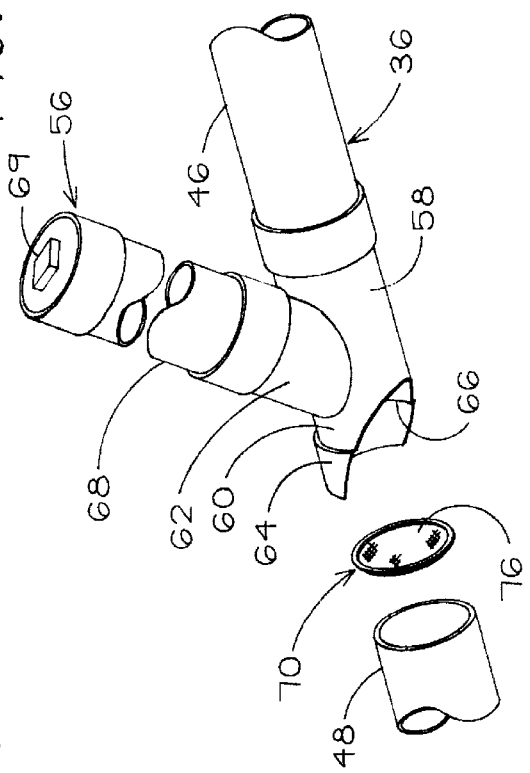
FIG. 2 is an enlarged exploded isometric view of a part of FIG. 1, showing fragments of upper and lower sections of the drain pipe, showing the clean-out with a branch thereof (partially broken away) to be connected to the lower section of the drain pipe and showing a test cap to be connected to the lower section between the section and the branch of the clean-out.

A three-way clean-out 56 (FIGS. 1, 2 and 3), usually of the same material as the drain pipe 36, has inlet, outlet and clean-out branches 58, 60 and 62, each having a collar 64 and an annular shoulder 66. The collars of the inlet and outlet branches are respectively slid over and cemented to the upper and lower sections 46 and 48 of the drain pipe with the shoulders of the clean-out normally abutting the ends of the pipe sections. A riser 68 is connected to the clean-out branch and extends above the surface of the ground 42, and a clean-out cover 69 is releasably connected to the riser for sealing and closing this branch when necessary.

As is well-known, building codes typically require plumbing installations for new construction to be tested for leaks twice: after the rough-in plumbing is in and after the top-out plumbing is completed. It is currently standard practice to insert an inflatable plug, not shown, down the clean-out branch 62 and into the outlet branch 60, to inflate the plug, and thus to block the drain pipe 36 so the plumbing system can be pressurized for leaks. Since such plugs have not been satisfactory as discussed above, the principles of the present invention involve conducting the tests differently.

In accordance with the method of the present invention and as part of the rough-in plumbing phase (FIGS. 1–5), a test cap or plug 70 of well-known construction is fitted in and connected to the lower section 48 of the drain pipe 36, and then the clean-out 56 is connected between and joins the upper and lower sections 46 and 48 of the drain pipe. The test cap has an annular body 72, an annular flange 74 extending radially outwardly from the body, and a circular center plate 76 filling the body.

Test caps, as 70 (FIGS. 2 through 5). suitable for the purposes of the present invention are sold by the PASCO Company of 11156 Wright Road, Lynwood, Calif. 90262, as part Nos. 4844 and 4845. These caps are of plastic material capable of being solvent-welded to ABS or PVC pipe, and are also commonly referred to as knock-out plugs. They are available in various sizes so that their annular bodies 72 can be fitted in three- or four-inch diameter drain pipes 36.

As above stated and during the rough-in plumbing stage, the test cap (FIGS. 2 and 5) is fitted in the lower section 48 of the drain pipe with the body 72 received within the pipe, the flange 74 engaging the end of the pipe, and the center plate 76 disposed transversely of and within the pipe. Prior to making this assembly, layers of a suitable bonding cement are applied as at 78 to the mating surfaces so as to solvent-weld the parts together in the described assembly. After the test cap is welded in place (FIG. 13), the collar 64 of the outlet branch 60 of the clean-out is slipped over and solvent-welded to the lower section of the drain pipe with the shoulder 66 of the outlet branch abutting the radial flange 74 of the test cap. The resulting connection (FIG. 3) of the test cap in the drain pipe effects a fluid-tight seal that will block flow through the pipe. Either before or after this connection, the inlet branch 58 of the clean-out is connected to the upper section 46 of the drain pipe.

Following the described assembly (FIGS. 1 and 3) of the test cap 70, the clean-out 56, and the upper and lower sections 46 and 48 of the drain pipe 36, the rough-in plumbing is subjected to a first pressure test. Such pressurization is accomplished in a well-known manner that includes introducing water into the system through an open end of a pipe in the interior plumbing 26. It is of course understood and well known that all open ends of the pipes in the system 20 are plugged including attaching the clean-out fitting 69 to the riser 68 of the clean-out branch 62. Such pressurization imposes fluid pressure on the upstream side of the test cap on the side thereof opposite from the sewer line 38. Since the test cap is bonded in fluid-tight relation within the drain pipe, no leaks will occur through or around the test cap. As a result, if there is any loss of pressure in the plumbing system, it will clearly be in the plumbing system itself and not in the plugging of the drain pipe by the test cap, as contrasted with the frequent leaks of the inflatable test plugs, as described above.

After the plumbing system 20 has passed the initial test at the rough-in plumbing stage, construction of the building continues (FIG. 6) including completion of the top-out plumbing job. This involves installation of one or more roof vents, as 86, extending up through the roof of the building, represented at 88. As part of finishing the construction, the ground 42 around the building is filled and graded, leaving the riser 68 exposed above ground level to allow access to the clean-out 56.

Figure 3:
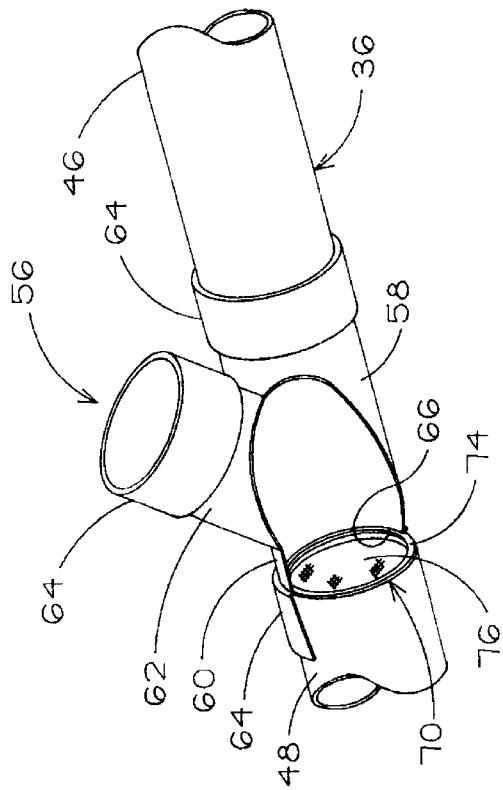
FIG. 3 is a still further enlarged view similar to FIG. 2 but with the parts assembled, thereby showing the clean-out connected between the upper and lower sections of the drain pipe and showing the test cap connected to the lower section between that section and the clean-out so as to block flow through the clean-out from the upper section of the drain pipe to the lower section thereof.

During the completion of the building 88 (FIG. 6), the test cap 70, the clean-out 56 and the drain pipe 36 are not disturbed and thus remain connected in the described relationship (FIG. 3). After the top-out stage is completed, a second test of the plumbing system 20 is conducted by again pressurizing the system 20 but this time typically by feeding water with a hose through an open roof vent, as 86. Once more, the test cap absolutely blocks flow through the drain pipe so that if there are any leaks in the system, they will be in the system and not in the plug in the drain pipe. If the system is sound, only one additional test is needed, but of course if there are leaks, they must be repaired and the test repeated until all problems are corrected.

Following successful passage of the second or final test or tests. however, it is of course necessary to remove the blockage caused by the test cap 70. In accordance with the principles of the present invention, the blockage is removed by a special plumbing tool 100 (FIGS. 7–11). This tool includes an elongated flexible shaft 102. preferably about four feet long and preferably about ¾" in diameter, and having upper and lower ends 104 and 106. In the disclosed embodiment, the shaft is a tightly wound coil spring 108 (FIG. 10) made of wire, the adjacent turns 110 of which are in close engagement when the shaft is unflexed, thereby imparting a measure of rigidity to the shaft notwithstanding its flexibility. Coil springs, as 108, suitable for the shaft of the present invention are sold as part No. 9504 by the Marco Products Company of Sylmar, Calif. Alternatively, other types of flexible shafts or cables with a measure of rigidity can be employed.

Figure 13:
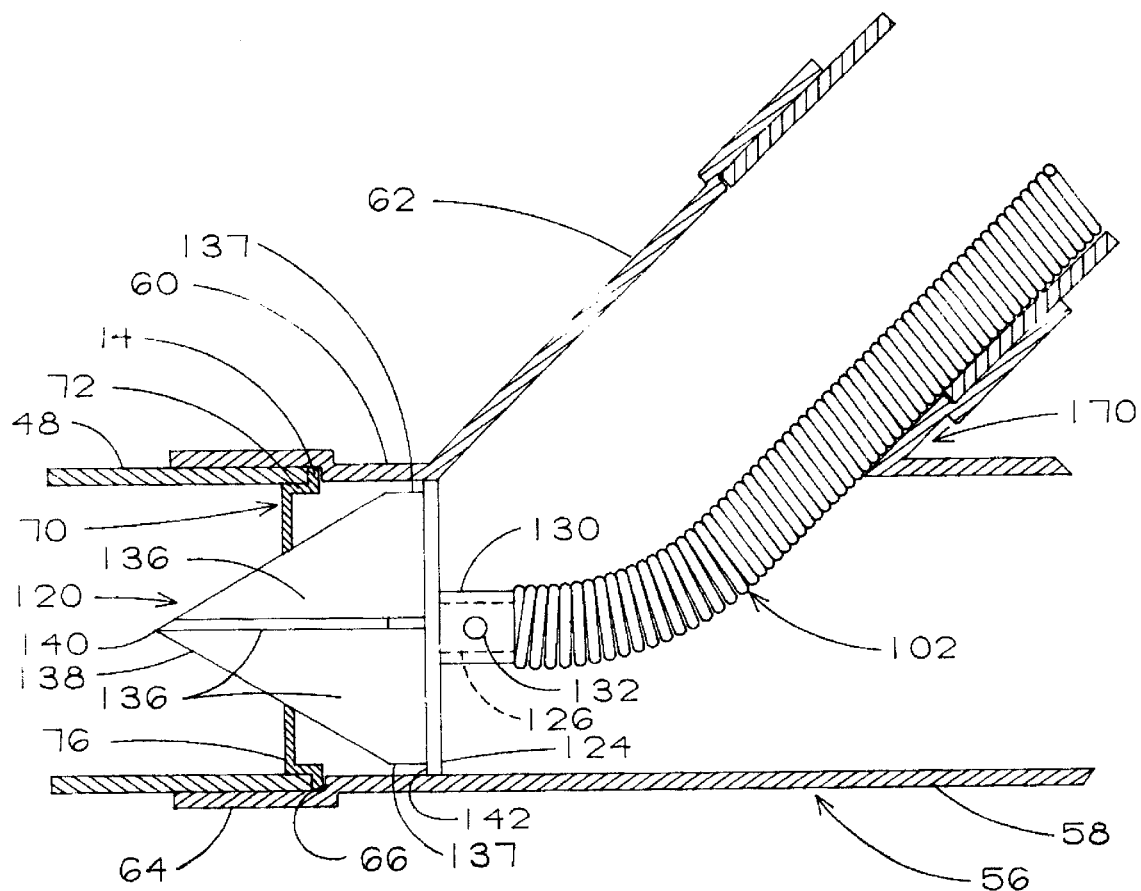
FIG. 13 is an enlarged fragmentary, vertical longitudinal section of the clean-out and part of the lower section of the drain pipe and showing the tool with its cutting head in cutting engagement faith the center plate of the cap.
Figure 11:
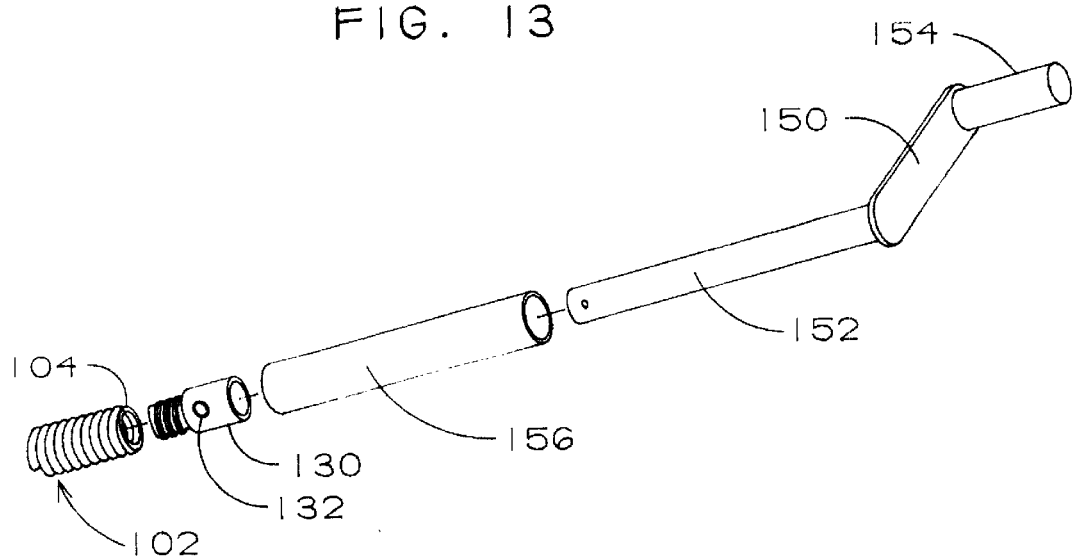
FIG. 11 is a reduced exploded isometric view of the tool of FIG. 7 and showing how the handles are connected to the shaft.

The plumbing tool 100 (FIGS. 7–11) also includes a cutting head 120 with a conical configuration releasably attached to the lower end 106 of the tool shaft 102. The cutting head has a mounting ring 122 disposed perpendicularly of the axis of the shaft when the shaft is straight and unflexed as in FIG. 7, a cruciform mounting bracket 124 secured within the ring, and a hub 126 extending from the bracket axially of the ring. The outside diameter of the mounting ring is of a dimension suitable for the size of clean-out 56 being used so that the ring will slidably and rotatably fit within the clean-out (FIG. 13). A lower coupling 130 (FIG. 9) is connected to the lower end 106 of the spring shaft, is fitted over the hub, and is fastened thereto by a set screw 132 on the coupling.

More specifically the lower coupling 130 (FIG. 9) has a female sleeve 134 that slips over the hub 126. The hub has a hole 128 that is aligned with and receives the set screw 132 to secure the coupling to the mounting ring 122. The lower coupling also has a threaded male stub 135 that threads into the lower end 106 of the spring shaft 102 thereby to secure the coupling to the shaft. It will be understood that the coupling 130 allows different sizes of cutting heads 120 to be connected to the tool shaft depending on the diameter of the drain pipe involved.

The cutting head 120 (FIGS. 7, 8, and 13) also has a plurality of triangular cutting blades 136 rigidly secured to and projecting endwardly from the mounting ring 122 and bracket 124. Four blades are used in the disclosed embodiment and are positioned in the four quadrants of the mounting ring and bracket with the base edges of blades welded to the mounting ring and bracket and the altitude edges of the tour blades welded together along the axis of the ring. The blades have axial guiding edges 137 and cutting edges 138 converging to a sharp point or tip 140 of the cutting head. The base edges are set radially inwardly (FIGS. 8 and 13) of the outside diameter of the mounting ring to leave an annular stop rim 142 circumscribing the blades adjacent to the mounting ring for a purpose to be described. When the tool shaft 102 is straight and unflexed (FIG. 7), the tip of the cutting head projects endwardly from and in coaxial alignment with the shaft.

In addition, the plumbing tool 100 (FIGS. 7 and 11) has a handle 150 that includes a crankshaft 152 connected to the upper end 104 of the tool shaft 102 and a crankhandle 154 projecting from the crankshaft. The crankshaft is connected to the tool shaft by an upper coupling 130 and set screw 132 in the same manner as the cutting head 120 is connected to the tool shaft, as described above. The handle also includes a holding sleeve 156 rotatably received on the crankshaft between the upper end of the upper coupling and the crankhandle.

It is to be noted that the length of the tool shaft 102 can be changed by connecting sections of springs as 108, for example each about two feet in length, together by intermediate couplings, not shown, but similar to the upper and lower couplings 130. As contrasted with the upper and lower couplings, however, the intermediate couplings have threaded male stubs at both ends for threading into adjacent open ends of adjacent springs. Thus, by having a supply of the spring sections and the intermediate couplings, the shaft can be made longer or shorter to suit particular jobs. Also, although the shaft in disclosed embodiment is a single length of spring preferably about four feet long, it may be made up of shorter lengths of springs (for example, and as above noted, each about two feet long) equaling four feet or any other desired length.

The plumbing tool 100 (FIG. 7) is held by grasping the sleeve 156 in one hand and the crankhandle 154 in the other hand. The tool shaft 102 and thus the cutting head 120 are rotated by turning the crankhandle while holding the sleeve. Also the tool shaft has sufficient rigidity to allow force to be transmitted through, and axially of the shaft to the tip 140 by grasping the sleeve in one hand and the crankhandle in the other and thrusting the tool axially of the tool shaft. Such rotation and axial thrusting can be accomplished at the same time whether the tool shaft is straight or flexed.

Figure 12:
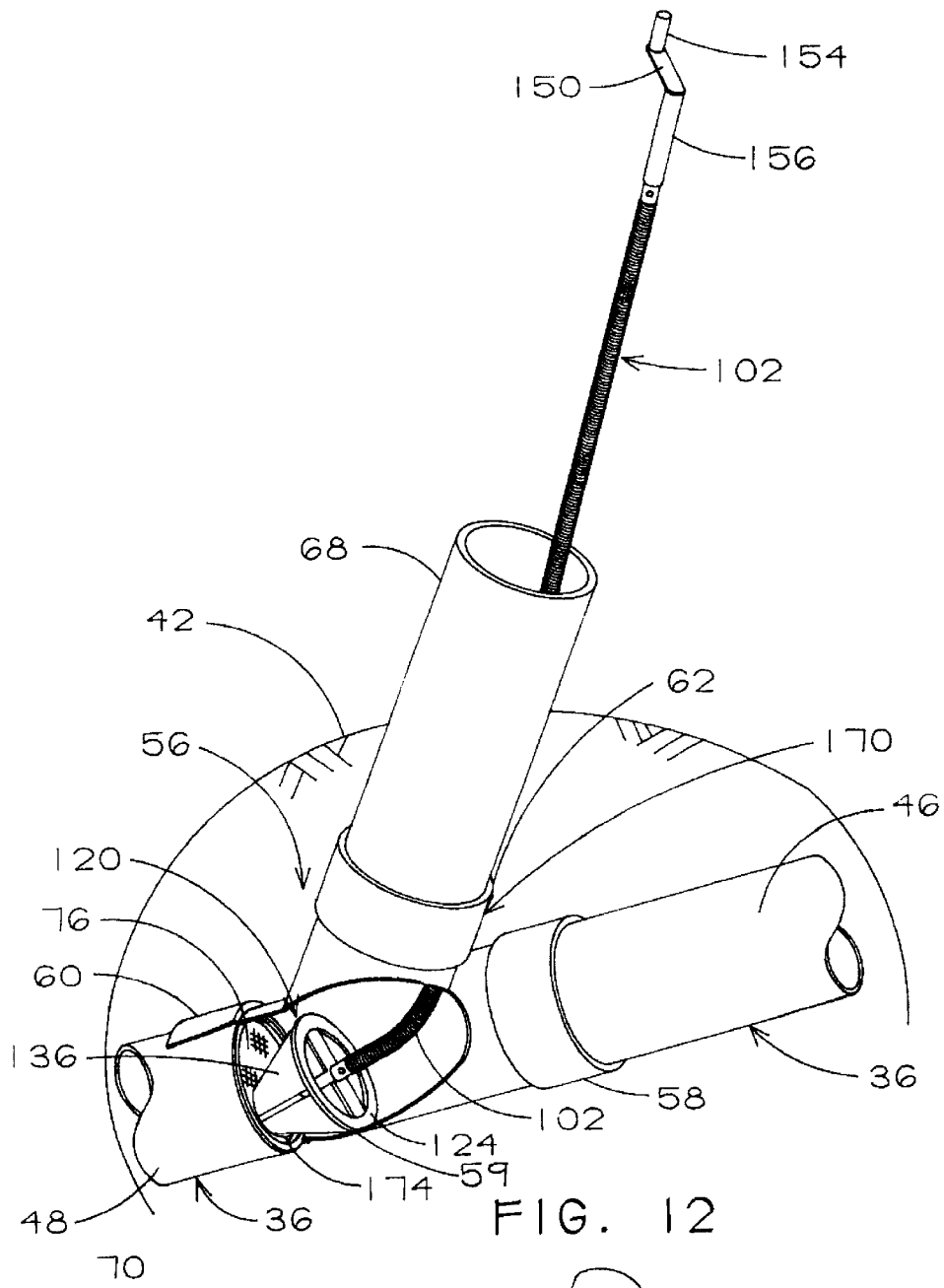
FIG. 12 is an isometric view similar to and on the same scale as FIG. 3 with an extension pipe connected to the clean-out, with the tool of FIG. 7 extended into the clean-out, and with part of the clean-out broken away to show the cutting head of the tool in cutting engagement with the center plate of the test cap.

The plumbing tool 100 is used to carry out the method of the present invention after all necessary pressure tests have been successfully completed. To this end, the cover 69 (FIG. 6) is removed and the cutting head 120 of the tool is inserted in the riser 68 (FIG. 12) and lowered down into the clean-out 56. The mounting ring 122 slidably engages the interior of the riser and the clean-out branch 62 and guides the cutting head down the clean-out until it exits the clean-out branch and strikes the base 59 of the clean-out (FIG. 12). Axial thrust is then imparted to the tool shaft 102 to cause the cutting head to tip over from a generally vertical attitude, not shown, into the generally horizontal attitude shown in FIG. 12, with the mounting ring engaging the base of the clean-out and the tip 140 pointing toward the test cap 70. Such tipping is facilitated by the flexibility of the shaft and the engagement of the shaft with the clean-out branch along area 170, but also by the downward slope of the drain pipe 36.

When in this generally horizontal position (FIGS. 12 and 13), further axial pressure on the tool shaft 102 causes the cutting head 120 to move axially downwardly of the drain pipe 36 toward the outlet branch 60. Because of the combined flexibility and rigidity of the tool shaft and the leveraging effect of the shaft bearing against the clean-out branch 62 and/or the riser 68 at region 170, this axial pressure on the tool shaft causes the tip 140 of the cutting head to move into engagement with the center plate 76 of the test cap 70. Then, the shaft is thrust sharply downwardly to force the tip of the cutting head to penetrate the plate creating an initial hole 174 (FIG. 12) in the plate.

Figure 14:
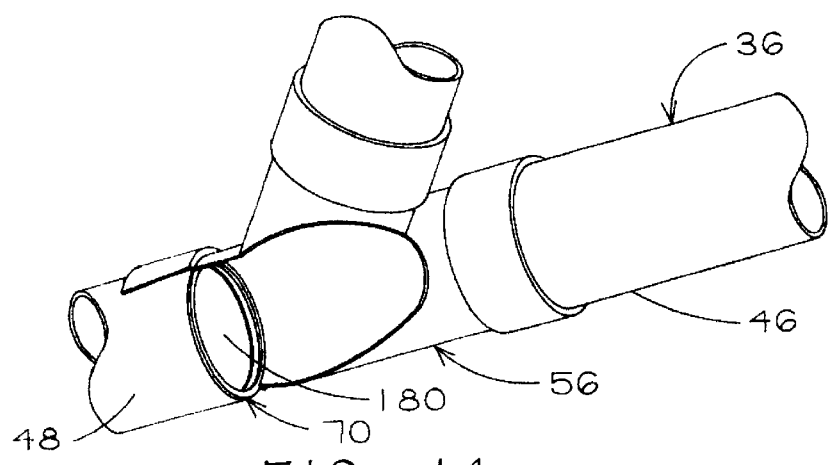
FIG. 14 is a view similar to FIG. 12 but with the tool removed and with the clean-out broken away to show how the cutting head has completely removed the center plate of the test cap thereby to open the drain pipe for movement of drain materials therethrough.

Thereafter, while continuing to apply axial downward pressure on the tool shaft 102 (FIG. 13), the tool shaft and the cutting head 120 are rotated with the crankhandle 154 to begin cutting away the center plate. The mounting ring 122 is soon rotatably slidably received in the outlet branch 60 and thereafter guides movement of the cutting head axially along the outlet branch. As the cutting action continues, the guiding edges 137 move within the annular body 72 of the test cap 70 to guide and center the cutting head. When the stop rim 142 strikes the radial flange 74, the cutting blades will have substantially completely cut or reamed out the center plate 76 from within the annular body 72 of the test cap to provide a large opening 180 (FIG. 14) in the test cap. This opening 180 is the about the same diameter as the inside diameter of the body since the diameter of the cutting head at the guiding edges 137 is the about the same diameter as the inside diameter of the body. In turn, the inside diameter of the body is just slightly less than the inside diameter of the drain pipe, so that creating the opening 180 will allow waste material to move essentially unimpeded through the pipe.

After the opening 180 has been created, the tool 100 is pulled back out of the outlet branch 60 and thence out of the clean-out branch 62 and riser 68. Because the stop rim 142 contacts the radial flange 74 of the test cap 70, the cutting head 120 does not hang-up or become locked in the clean-out. It is also to be noted that the cut fragments, not shown, of the center plate are subsequently flushed down the lower section 48 of the drain pipe to the sewer line 38.

From the foregoing it will be understood that an improved method for testing a newly installed plumbing system has been provided including a tool 100 used in carrying out the method. The method is more cost-effective because it avoids having to re-test a plumbing system 20 that would have passed the test but did not only because the test plug failed. Since the method does not use inflatable test plugs to seal of the drain pipe 36 while doing the testing, the common failure of the inflatable plug does not cause a failed test. Instead the method involves use of a test cap which positively seals the drain pipe and allows an accurate test of the plumbing system. The test cap and its positive seal can be employed because the method also uses the tool 100 that can be extended into the clean-out and operated from a remote position to cut an opening 180 in the cap and remove the blockage from the pipe. It will be recognized that although the method and tool have been described and shown with an underground clean-out they can be used equally as well when the clean-out is in a basement or otherwise above ground.

It will also be more generally recognized that since, as stated above, the test cap 70 is a blockage in the line, the tool is useful not only for removing test caps but also any such blockage that is so fixed or secured in the line that it prevents, either partially or completely, fluid flow therethrough.

Although a preferred embodiment of the present invention has been shown and described, various modifications and substitutions may be made thereto without departing from the spirit and scope of the invention. Accordingly it is to be understood that the present invention has been described by way of illustration and not limitation.

What is claimed is:

1. A tool for penetrating and cutting an opening through a blockage in a fluid-carrying line that is blocking flow therethrough, wherein a branch laterally extending from the drain line provides access to the blockage, and wherein the line has an inside diameter, comprising:

a rotary operating head having a front nose, a rear hub, opposite sides, an axis of rotation extending fore and aft of the head, and a maximum diameter adjacent to the hub that is transverse to the axis and approximately equal to the inside diameter of the line, the head having rigid, planar, penetrating and cutting blades extending fore and aft of the head and radially outwardly from said axis on opposite sides of the head in more than two, substantially equally peripherally spaced, different directions, the blades having continuous rigid peripheral edges converging from the maximum diameter to the front nose;

a handle including a crankshaft and a crankhandle projecting from the crankshaft;

a holding sleeve fitted on the crankshaft with the crankshaft being rotatable within the sleeve; and an elongated shaft having an upper end connected to the crankshaft in alignment therewith and adjacent to the crankhandle and a lower end connected to the hub, the shaft having opposite sides, the shaft including a tightly wound coil spring extending from the crankshaft to the hub, the spring having a plurality of turns, the shaft having a normally straight condition wherein adjacent turns of the spring are in close engagement circumferentially of the shaft and wherein the shaft and the crankshaft together possess axial rigidity from the crankhandle to the hub through the engaged turns circumferentially of the shaft, the shaft also possessing limited transverse flexibility and thereby having transversely flexed conditions wherein adjacent turns of the spring are in close engagement along one side of the shaft but are closely spaced along the opposite side of the shaft wherein the shaft and the crankshaft together possess axial rigidity from the crankhandle to the hub through the engaged turns along said one side of the shaft, whereby an operator can manually exert force on the head axially of the shaft through said engaged turns by gripping the holding sleeve and the crankhandle and pressing against the crankhandle axially of the shaft and toward the head, whereby an operator can thus manually apply thrusting force to the head and against a blockage in an effort to cause the head to penetrate the blockage, and whereby an operator can thusly manually apply continuous force to the head while rotating it against a blockage in an effort to cause the head to ream an opening though the blockage.

2. The tool of claim 1, wherein the head is a cutting head and has a conical configuration.

3. The tool of claim 1, wherein the head at its maximum diameter constitutes a guiding portion of the head for guiding it axially within the line.

4. The tool of claim 1, wherein the shaft is releasably connected to the head.

5. The tool of claim 1, wherein the edges of the blades are cutting edges.

6. The tool of claim 1, wherein the blades are triangular.

7. The tool of claim 1, wherein there are four blades.

8. The tool of claim 1 wherein the blockage is located relatively adjacent to the branch and wherein the tool is used from an operator's site adjacent to the branch at a predetermined operating distance from the blockage, wherein the length of the tool from the nose to the crankhandle is approximately the same as said operating distance.

9. A tool for making an opening through a blockage in a fluid-carrying line that is blocking flow therethrough and wherein a branch laterally connected to and extending from the drain line provides access to the blockage, comprising:

an operating head having forward and rearward portions, at least three rigid planar penetrating and reaming blades capable of penetrating and reaming an opening through the blockage, and a rearward guiding portion having a diameter approximately equal to the inside diameter of the fluid-carrying line, the blades being spaced circumferentially of the head and converging from the guiding portion along at least three sides of the head to a forward nose of the head;

a shaft including a coil spring that has engaged turns and straight and flexed conditions, the shaft having axial rigidity through the engaged turns in both its straight and flexed conditions, the spring being connected to the rearward portion of the operating head for extending the operating head into the branch and then into the fluid-carrying line and being capable of flexing in the transition from the branch to the line to enable engagement of the operating head with the blockage;

a handle including a crankshaft connected to the shaft and a crank extending from the crankshaft, the tool having axial rigidity from the handle to the head whether or not the coil spring is straight or flexed; and a handling sleeve circumscribing the crankshaft with the crankshaft rotatable within the sleeve, whereby an operator can manually exert force on the head axially of the shaft through the engaged turns of the spring by gripping the sleeve and the crank and pressing against the handle axially of the shaft and toward the head, whereby an operator can thusly manually apply thrusting force to the head and against a blockage in an effort to cause the head to penetrate the blockage and whereby an operator can thusly manually apply continuous force to the head while rotating it against a blockage in an effort to cause the head to ream an opening through the blockage.

10. A tool for penetrating and cutting an opening through a blockage in a fluid-carrying line that is blocking flow therethrough, wherein a branch laterally extending from the drain line provides access to the blockage, wherein the line has an inside diameter, comprising:

an operating head having a front nose, a rear hub, opposite sides, an axis of rotation extending fore and aft of the head, and a maximum diameter adjacent to the hub that is transverse to the axis and approximately equal to the inside diameter of the line, the head having rigid planar, penetrating and cutting blades extending fore and aft of the head and radially outwardly from said axis on opposite sides of the head in more than two, substantially equally peripherally spaced, different directions, the blades having continuous rigid peripheral edges converging from the maximum diameter to the front nose;

a handle including a crankshaft and a crankhandle projecting from the crankshaft;

a holding sleeve fitted on the crankshaft with the crankshaft being rotatable within the sleeve; and an elongated shaft having an upper end connected to the crankshaft in alignment therewith and adjacent to the crankhandle and a lower end connected to the hub, the shaft having opposite sides and including a flexible section extending from the crankshaft to the hub, the shaft having a normally straight condition wherein the shaft and the crankshaft together possess axial rigidity from the crankhandle to the hub, the shaft also possessing limited transverse flexibility in said flexible section wherein the shaft and the crankshaft together still possess axial rigidity from the crankhandle to the hub, whereby an operator can manually exert force on the head axially of the shaft by gripping the sleeve and the crankhandle and pressing against the crankhandle axially of the shaft and toward the head, whereby an operator can thusly manually apply thrusting force to the head and against a blockage in an effort to cause the head to penetrate the blockage, and whereby an operator can thusly manually apply continuous force to the head while rotating it against a blockage in an effort to cause the head to ream an opening through the blockage.

11. A tool for penetrating and cutting an opening through a blockage in a fluid-carrying line that is blocking flow therethrough, wherein a branch laterally extending from the drain line provides access to the blockage, wherein the line has an inside diameter, comprising:

an operating head having front penetrating nose and rear connector, opposite sides, an axis of rotation extending fore and aft of the head, and a plurality of substantially equally peripherally spaced rigid, planar, penetrating and cutting blades extending fore and aft of the head and radially outwardly from said axis on opposite sides of the head, the blades having peripheral edges forwardly converging to the nose;

a handle including a crankshaft and a crankhandle projecting from the crankshaft;

a holding sleeve fitted on the crankshaft with the crankshaft rotatable within the sleeve; and an elongated shaft having an upper end connected to the crankshaft adjacent to the crankhandle and in alignment therewith and a lower end connected to the connector, the shaft opposite sides and including a tightly wound coil spring extending from the crankshaft to the connector and having a plurality of turns, the shaft having a normally straight condition wherein adjacent turns of the spring are in close engagement circumferentially of the shaft and wherein the shaft and the crankshaft together possess axial rigidity from the crankhandle to the connector through said engaged turns circumferentially of the shaft, the shaft also possessing limited transverse flexibility and thereby having transversely flexed conditions wherein adjacent turns of the spring are in close engagement along one side of the shaft but are closely spaced along the opposite side of the shaft wherein the shaft and the crankshaft together possess axial rigidity from the crankhandle to the connector through the engaged turns along said one side of the shaft, whereby an operator can manually exert force on the head axially of the shaft through the engaged turns of the spring by gripping the sleeve and the crankhandle and pressing against the crankhandle axially of the shaft and toward the head, whereby an operator can thusly manually apply thrusting force to the head and against a blockage in an effort to cause the head to penetrate the blockage, and whereby an operator can thusly manually apply continuous force to the head while rotating it against a blockage in an effort to cause the head to ream an opening through the blockage.

12. A method for using a tool that enables an operator to create an opening through a blockage in a drain line that is blocking flow therethrough by inserting the tool into a passageway that communicates with the line and that leads to the blockage, the tool providing a normally straight, resiliently transversely flexible, axially rigid shaft having opposite ends; a rotary head having rigid, blades radiating from an axis of rotation and being connected to one end of the shaft; a crankhandle connected to the shaft; and a holding sleeve circumscribing the shaft so that the shaft can rotate within the sleeve, the method comprising the steps of:

inserting first the head and then the shaft into the passageway while holding the tool by the crankhandle and the sleeve;

while continuing to hold the tool by the crankhandle and the sleeve, applying axial force to the shaft and pushing the head along the passageway, causing the shaft to flex around any curves that may exist in the passageway until the head engages the blockage;

while continuing to grasp the crankhandle and the sleeve, imparting thrusting force with the crankhandle axially of the shaft and the head in the direction of the blockage thereby causing the blades to strike the blockage with a sharp blow intended to penetrate the blockage with the blades; and rotating the shaft and the head by rotating the crankhandle while holding the sleeve and while continuing to apply axial force to the shaft and head in said direction with the crankhandle thereby causing the blades to cut through the blockage.

13. The method of claim 12, including the further steps of:
wherein in applying the sharp thrusting force, the tool including the shaft and head are held in the two hands of the operator and the tool is axially thrust into the passageway and the head imparts a penetrating blow against the blockage.

14. The method of claim 12, including the further steps of:
leveraging the shaft against the passageway as the tool approaches the blockage; and
axially pressing on the crankhandle while holding the handle and causing the shaft to slideably bear against the passageway and force the head toward and into engagement with the blockage.

* * * * *